United States Patent
Schmidgall et al.

(10) Patent No.: US 10,836,586 B2
(45) Date of Patent: Nov. 17, 2020

(54) CONVEYOR SYSTEMS, METHODS AND APPARATUS

(71) Applicant: Superior Industries, Inc., Morris, MN (US)

(72) Inventors: Paul D. Schmidgall, Morris, MN (US); Jamie Solvie, Morris, MN (US)

(73) Assignee: Superior Industries, Inc., Morris, MN (US)

( * ) Notice: Subject to any disclaimer, the term of this patent is extended or adjusted under 35 U.S.C. 154(b) by 0 days.

(21) Appl. No.: 16/516,787

(22) Filed: Jul. 19, 2019

(65) Prior Publication Data

US 2020/0024078 A1      Jan. 23, 2020

Related U.S. Application Data (60) Provisional application No. 62/828,172, filed on Apr. 2, 2019, provisional application No. 62/700,574, filed on Jul. 19, 2018.

(51) Int. Cl.
*B65G 45/14*     (2006.01)
*B65G 45/16*     (2006.01)

(52) U.S. Cl.
CPC ............ *B65G 45/14* (2013.01); *B65G 45/16* (2013.01)

(58) Field of Classification Search
CPC ........ B65G 45/10; B65G 45/12; B65G 45/14; B65G 45/16; B65G 45/18; B65G 45/20; B65G 45/24
See application file for complete search history.

(56) References Cited

U.S. PATENT DOCUMENTS

| | | | | |
|---|---|---|---|---|
| 4,352,425 A * | 10/1982 | Childress | ............... | B65G 45/16 198/497 |
| 4,795,024 A * | 1/1989 | Eatwell | ................. | B65G 45/16 15/256.6 |
| 5,779,024 A * | 7/1998 | Harper | ................... | B65G 45/18 198/496 |
| 5,887,702 A * | 3/1999 | Mott | ..................... | B65G 45/16 198/499 |
| 10,046,919 B1 * | 8/2018 | Stenvik | ................... | B65G 15/28 |
| 2006/0243306 A1 * | 11/2006 | Wimsatt | ................... | B08B 1/02 134/9 |

FOREIGN PATENT DOCUMENTS

| | | | | |
|---|---|---|---|---|
| GB | 1295314 A * | 11/1972 | ............. | B65G 45/12 |
| GB | 2005620 A * | 4/1979 | ............. | B65G 45/16 |

* cited by examiner

*Primary Examiner* — Mark A Deuble
(74) *Attorney, Agent, or Firm* — Todd R. Fronek; Larkin Hoffman Daly & Lindgren Ltd.

(57) ABSTRACT

Conveyor belt cleaners are described. In some embodiments, the cleaner is installable and removable from the conveyor along a length thereof. In some embodiments, the cleaner is supported on one or more flexible supports. In some embodiments, the cleaner is removably attachable on the conveyor without modifying the conveyor. In some embodiments, the cleaner is removably mountable to one or more rails of the conveyor. In some embodiments, a side roller is supported on a drop bracket used to support a generally horizontal roller such as a return roller.

18 Claims, 15 Drawing Sheets

CONVEYOR SYSTEMS, METHODS AND APPARATUS

BACKGROUND

Conveyor belts are used to convey material such as aggregate material.

DESCRIPTION

Referring to the drawings, wherein like reference numerals designate identical or corresponding parts throughout the several views, FIGS. 1-4 illustrates a conveyor belt cleaner assembly 100 mounted (e.g., removably mounted) to a conveyor 10. The conveyor 10 optionally comprises longitudinally extending rails 12 (e.g., upper rails such as left rail 12-1 and right rail 12-2). The assembly 100 optionally includes a plurality of supports such as flexible supports 144 (e.g., chains, straps, tethers, etc.). Each support 144 is optionally removably mounted (e.g., by clamping) to a rail 12. The supports 144 are optionally arranged in an opposing manner (e.g., support 144-1a extends in a generally opposing direction from support 144-2b). The supports 144 are optionally in tension (e.g., taut, fully extended, etc.) when attached to the rails 12, e.g., by positioning the locations of attachment to the rails in spaced-apart relation and/or by gravity.

In some embodiments, the position (e.g., the height along an axis normal to the belt 14) of the assembly 100 is adjustable (e.g., adjustable relative to conveyor support structure such as the rails 12). It should be appreciated that in various implementations, the distance of belt 14 relative to rails 12 or other support structure may be varied such that height adjustment of the assembly 100 (e.g., rolls and/or blade thereof) relative to such support structure can enable alignment of the assembly 100 with the belt 14 to be cleaned. In some embodiments, the mounting location (e.g., along the rail or on the assembly 100) and/or the angle of the flexible supports 144 can be modified in order to adjust the height of the assembly 100 relative to the rails 12 or other support.

The assembly 100 optionally includes one or more cleaning elements such as a scraper blade 130. The scraper blade 130 optionally contacts a belt 14 (e.g., endless conveyor belt) of the conveyor (e.g., in some embodiments, a lower return portion 15 of the belt 14 which optionally travels along a travel direction T) to remove material from the belt 14 (e.g., the underside of the return portion 15). The assembly 100 optionally includes one or more rolls 120 (e.g., idler rolls, etc.) which optionally rollingly engage the belt (e.g., the upper side of the return portion 15). The rolls 120 (e.g., rolls 120a, 120b) optionally retain the position of the belt 14 while the blade 130 presses against the underside of the belt 14. The blade 130 optionally contacts the belt 14 at a location disposed longitudinally offset from one or more rolls 120 (e.g., longitudinally between two rolls 120a, 120b).

Each roll 120a, 120b is optionally supported (e.g., rollingly supported) at opposing ends thereof on first and second side brackets 146-1, 146-2. The side brackets 146 are optionally disposed laterally on either side of the belt 14 and extend below the lower return portion 15.

The blade 130 is optionally supported on (e.g., rigidly mounted to) a transversely extending shaft 135. The transversely extending shaft 135 is optionally mounted (e.g., rigidly mounted) to a biasing assembly 110 (e.g., using a collar 112). The biasing assembly 110 optionally resiliently biases the shaft 135 and blade 130 upward against the belt 14. Opposing ends of shaft 135 optionally extend through corresponding openings 148 (e.g., vertically extending slot) in the side brackets 146-1, 146-2. The collar 112 is optionally disposed outboard of side brackets 146. The shaft 135 is optionally movable vertically within the opening 148. The shaft 135 optionally does not move substantially laterally (e.g., left to right) relative to side brackets 146. The opening 148 optionally limits longitudinal (e.g., forward and backward) movement of the shaft 135 relative to bracket 146.

Each biasing assembly 110 optionally includes a rod 115 (e.g., threaded rod) mounted to collar 112. The rod 115 optionally extends through an opening in a laterally extending lip 114. The lip 114 optionally extends from a bracket 113 mounted to the side bracket 146; in alternative embodiments, the lip 114 is supported on or formed as a part with the side bracket 146. An upper end of a spring 116 (e.g., coil spring, compression spring, etc.) optionally contacts a stop 118 such as a washer or other structure mounted (e.g., height-adjustably mounted such as by threading) on the rod 115. The spring 116 is optionally contacted at a lower end thereof by the lip 114 of the side bracket 146. The spring 116 optionally has a greater diameter than the opening in lip 114 through which the rod 115 extends such that the spring rests on the lip 114. Thus in some embodiments, the bracket 146 and stop 118 cooperate to apply a compression to spring 116. The spring 116 thus optionally biases the stop 118 (and thus the rod 115) upward such that the shaft 135 (and thus blade 130) are biased upward. It should be appreciated that optional height adjustment of stop 118 along rod 115 (e.g., by turning the stop 118 on threads of the rod 115) may be carried out to adjust the compression in the spring 116 and thus the biasing pressure imposed by the blade 130 on the belt 14. The stop 118 may include a nut or other threaded element which engages the threads of rod 115. The stop 118 is optionally disposed outboard of the brackets 146 for ease of access to an operator.

Each support 144 is optionally attached at a first end to a side bracket 146 such as to one or more openings 147 in the bracket 146. Each support 144 is optionally attached at a second end to a clamp 142. For example, the support 144 is optionally attached to a loop 145 which is optionally attached to (e.g., by welding, threading, etc.) to clamp 142. The clamp 142 is optionally removably mounted to the rail 12 by tightening a clamping arm 143 (e.g., threaded rod, etc.) of the clamp 142. The clamp 142 optionally removably engages a lip 13 (e.g., transversely extending lip) of the rail 12. In some embodiments, the lengths of supports 144 are selected such that when the supports 144 are fully extended, the upper end of blade 130 is disposed adjacent to and/or contacting belt 14. In some embodiments, upon installation the supports 144 extend in a generally vertical plane. In some embodiments, upon installation the supports 144 extend in a non-vertical plane, e.g., in some embodiments the end of support 144 attached to clamp 142 is optionally inboard or outboard of the end of support 144 attached to side bracket 146.

Figure 16:
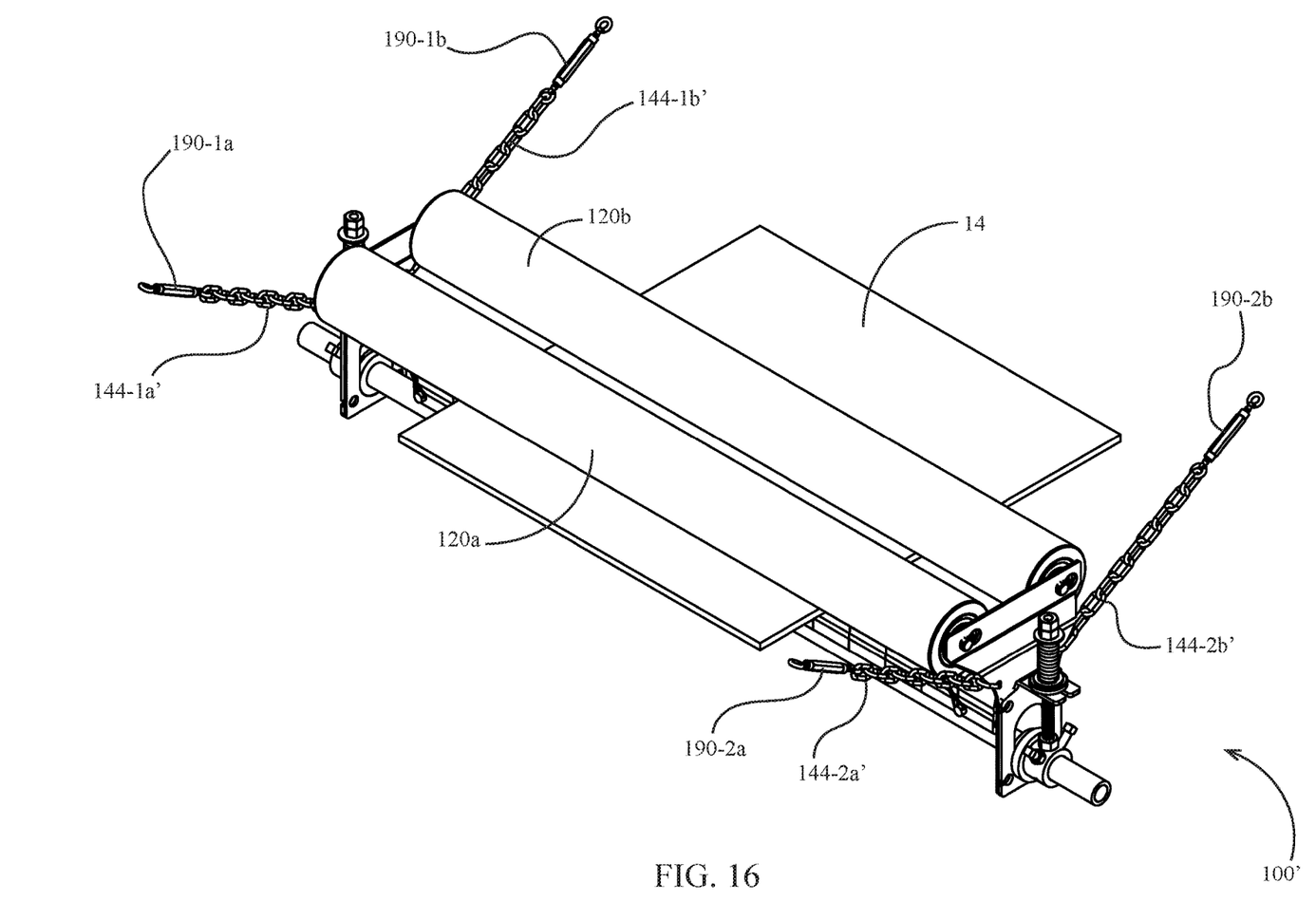
FIG. 16 is a perspective view of another embodiment of a conveyor belt roller assembly.

Referring to FIG. 16, in some embodiments a conveyor belt cleaner assembly may be supported by one or more turnbuckles or other supports having adjustable tension and/or length. The illustrated assembly 100' may be generally similar to the assembly 100, except that the modified flexible supports 144' include turnbuckles 190 which may be adjustable (e.g., length-adjustable) in order to adjust the height of the assembly 100' relative to the belt 14 and/or to adjust the force applied to the belt 14 by the assembly 100'. In some other embodiments, the flexible supports may be replaced with a turnbuckle or other length-adjustable or tension-adjustable device or structure.

Figure 7:
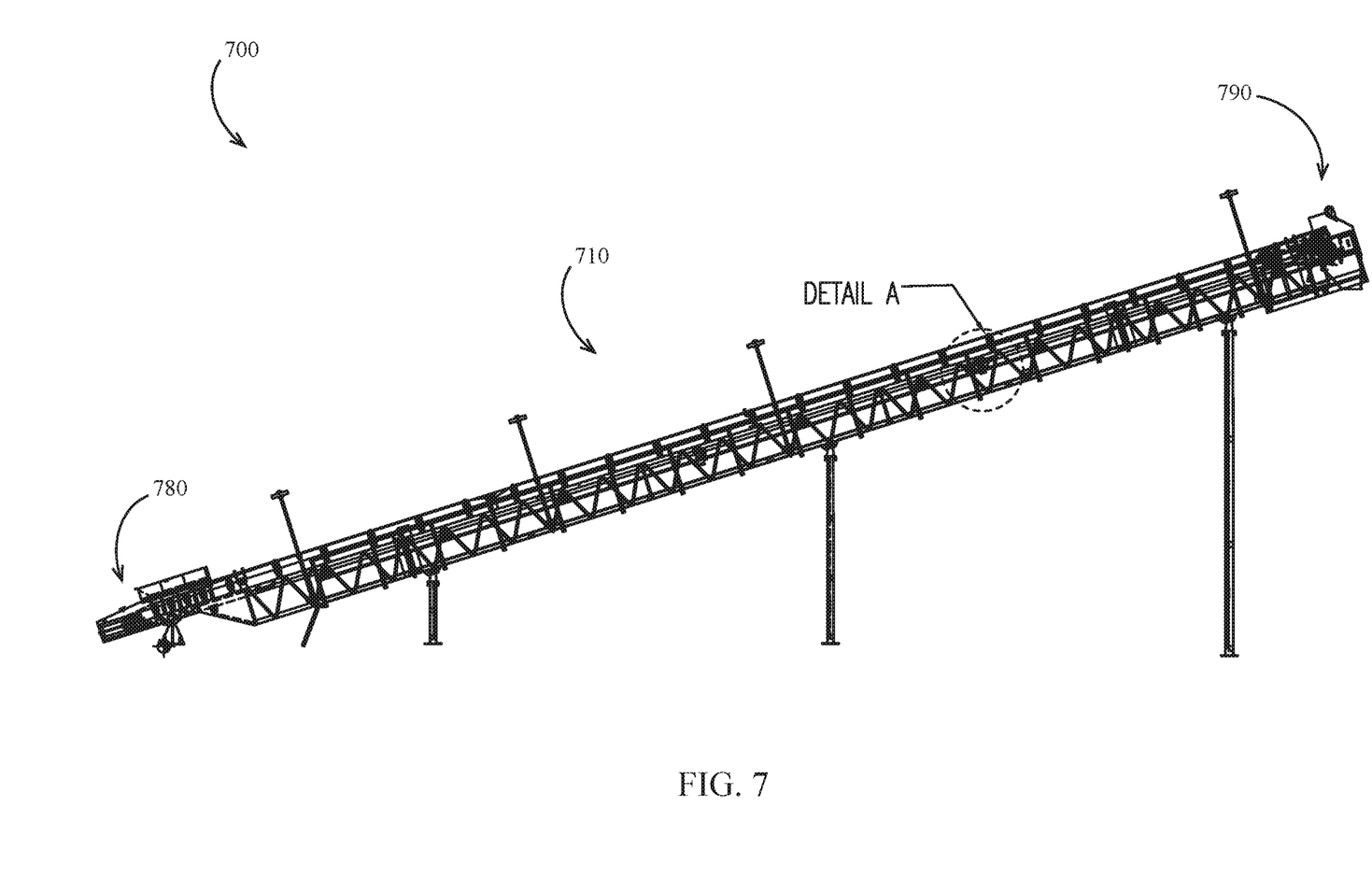
FIG. 7 is a side elevation view of an embodiment of a conveyor with a belt cleaner assembly installed thereon.
Figure 8:
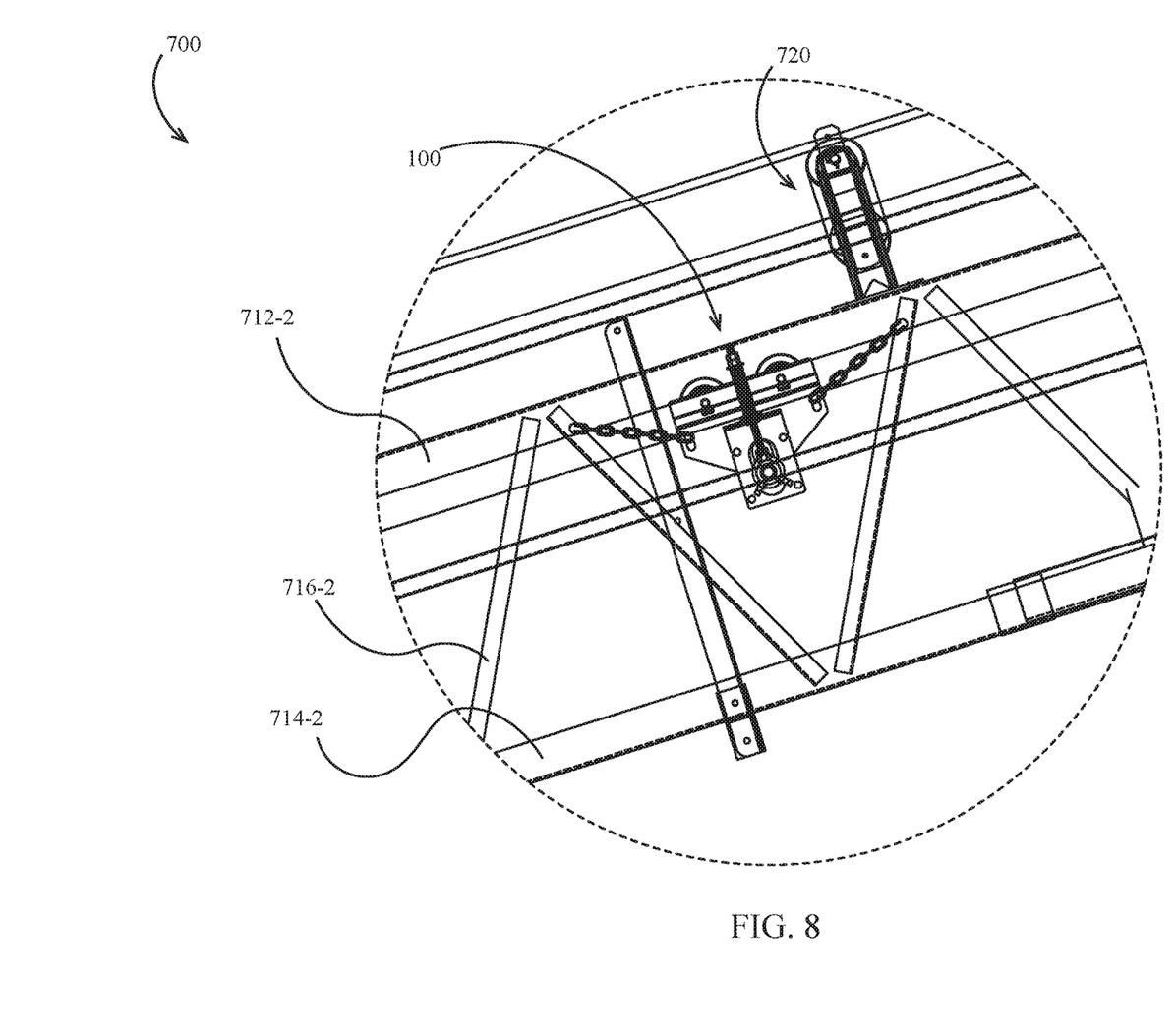
FIG. 8 is an enlarged view of the detail area A of FIG. 7.

Referring to FIGS. 7 and 8, the assembly 100 is shown installed on conveyor 700 comprising a conveyor truss 710, tail pulley 780 and head pulley 790. In various embodiments, the conveyor 700 is a stationary or portable conveyor supported on various alternative supports stationary supports, transport wheels, radial travel wheels, tracks, etc. In various embodiments, the conveyor 700 is of fixed length or a stacking-type (e.g., telescoping) conveyor having a plurality of telescoping truss sections.

The conveyor 700 optionally comprises upper rails 712-1, 712-2 and lower rails 714-1, 714-2. The rails 712, 714 are optionally joined by a plurality of members 716 (e.g., struts). A plurality of idler assemblies 720 is disposed along the length of the conveyor 700 for supporting a belt 14. One or more idler assemblies 720 are optionally supported on the truss 710, e.g., on upper rails 712. The assembly 100 is optionally supported on the upper rails 712 as described with respect to conveyor 10.

Figure 1:
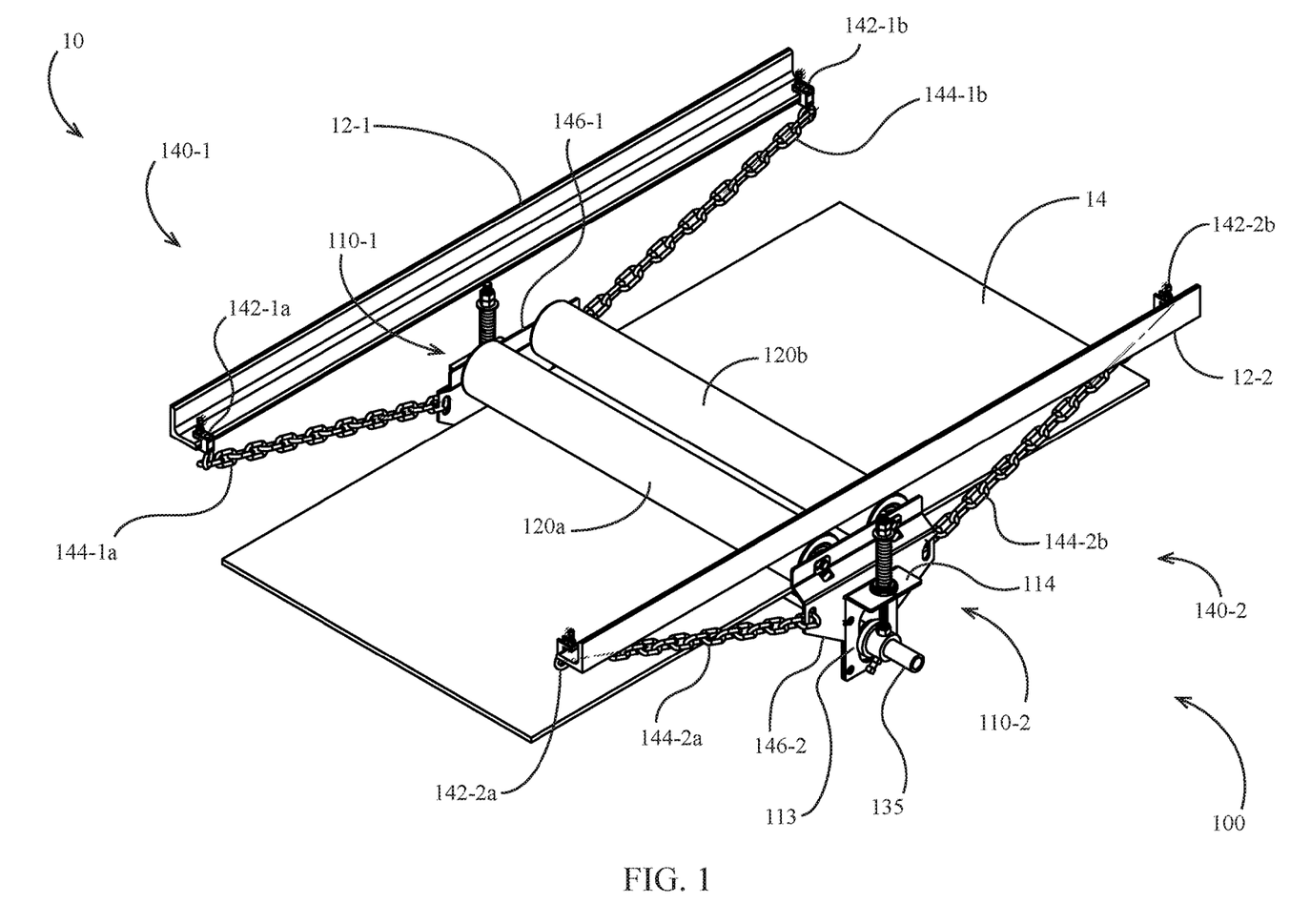
FIG. 1 is a perspective view of an embodiment of a belt cleaner assembly installed on an embodiment of a conveyor.
Figure 2:
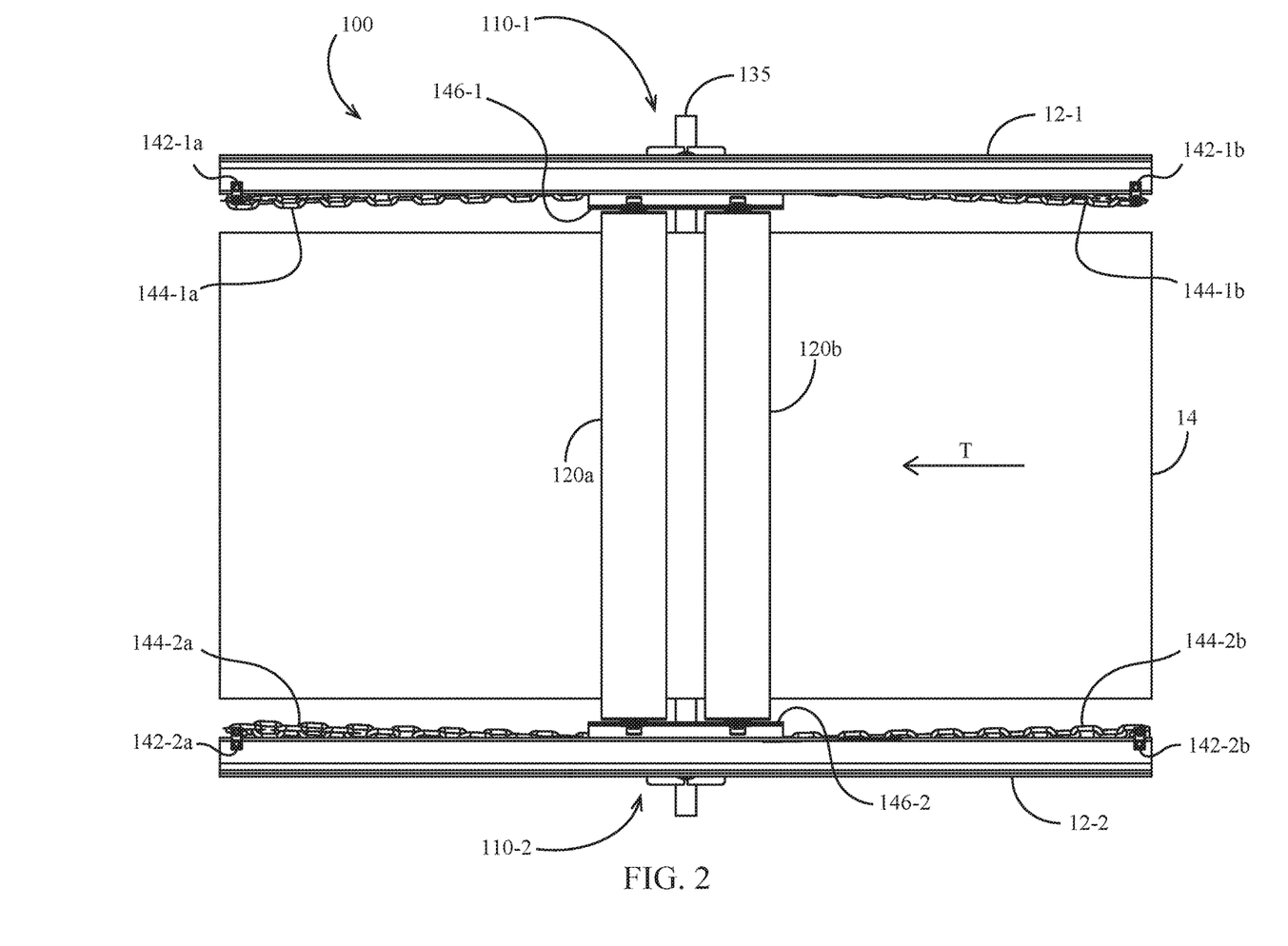
FIG. 2 is a top view of the belt cleaner assembly of FIG. 1.
Figure 3:
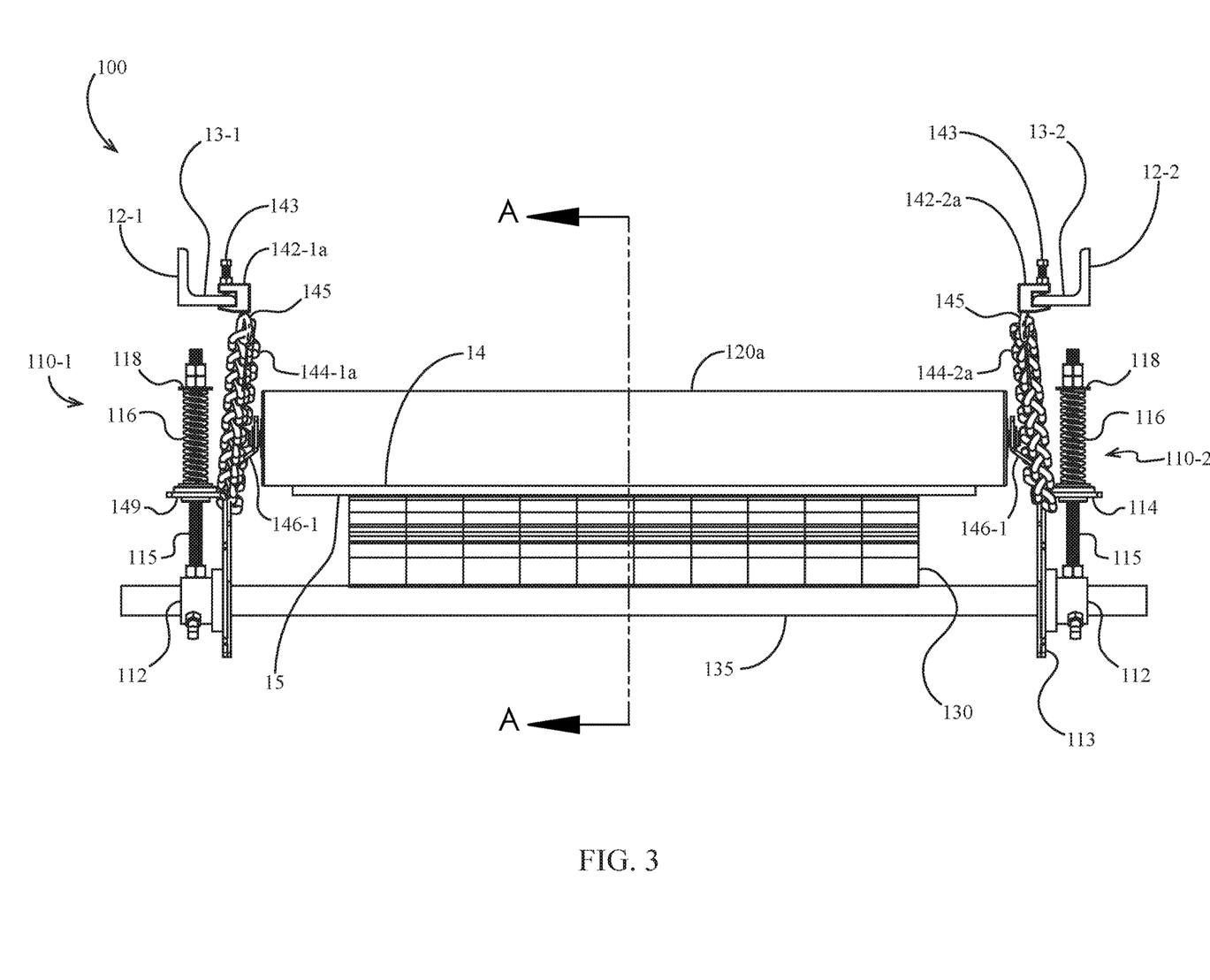
FIG. 3 is a front view of the belt cleaner assembly of FIG. 1.
Figure 4:
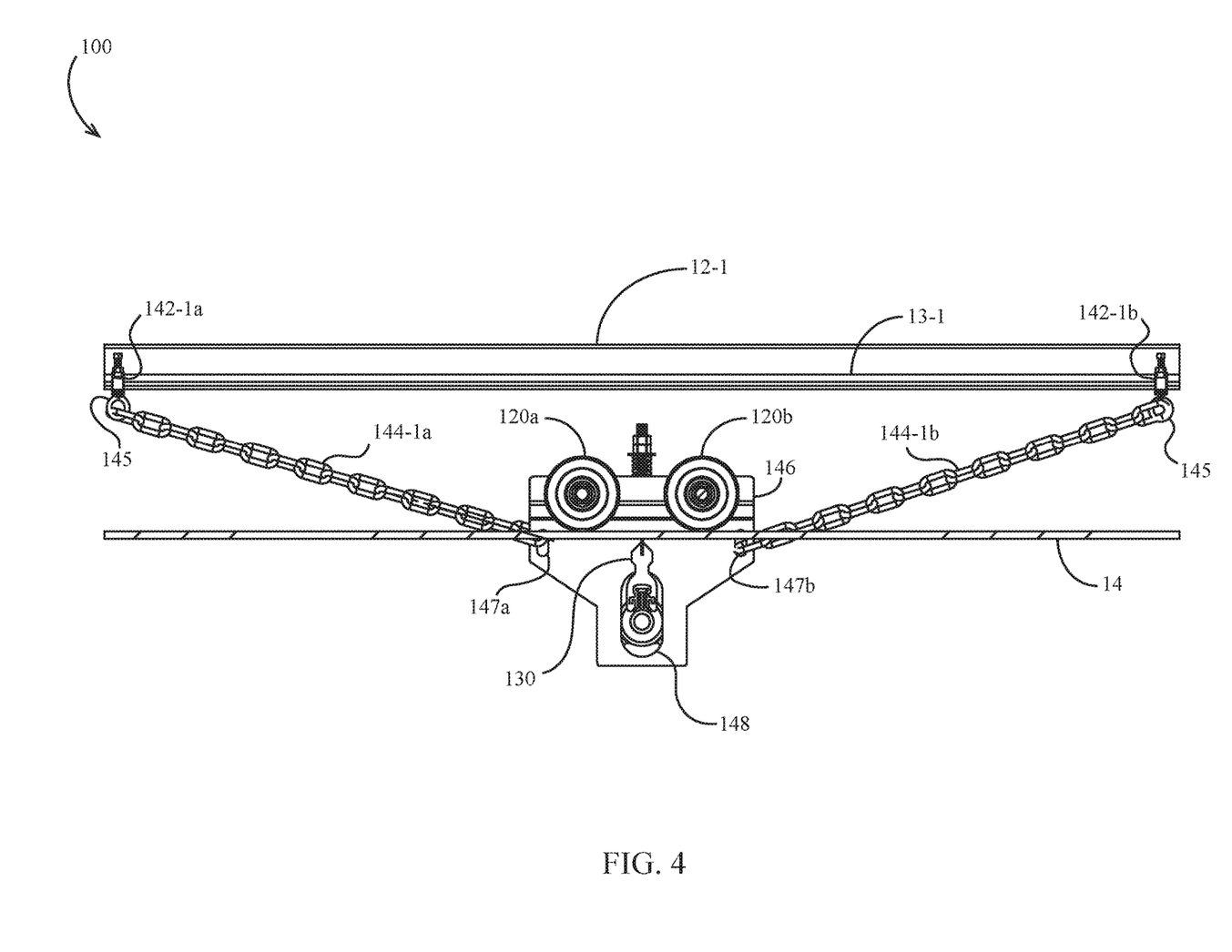
FIG. 4 is a sectional view along section A-A of FIG. 3.
Figure 5:
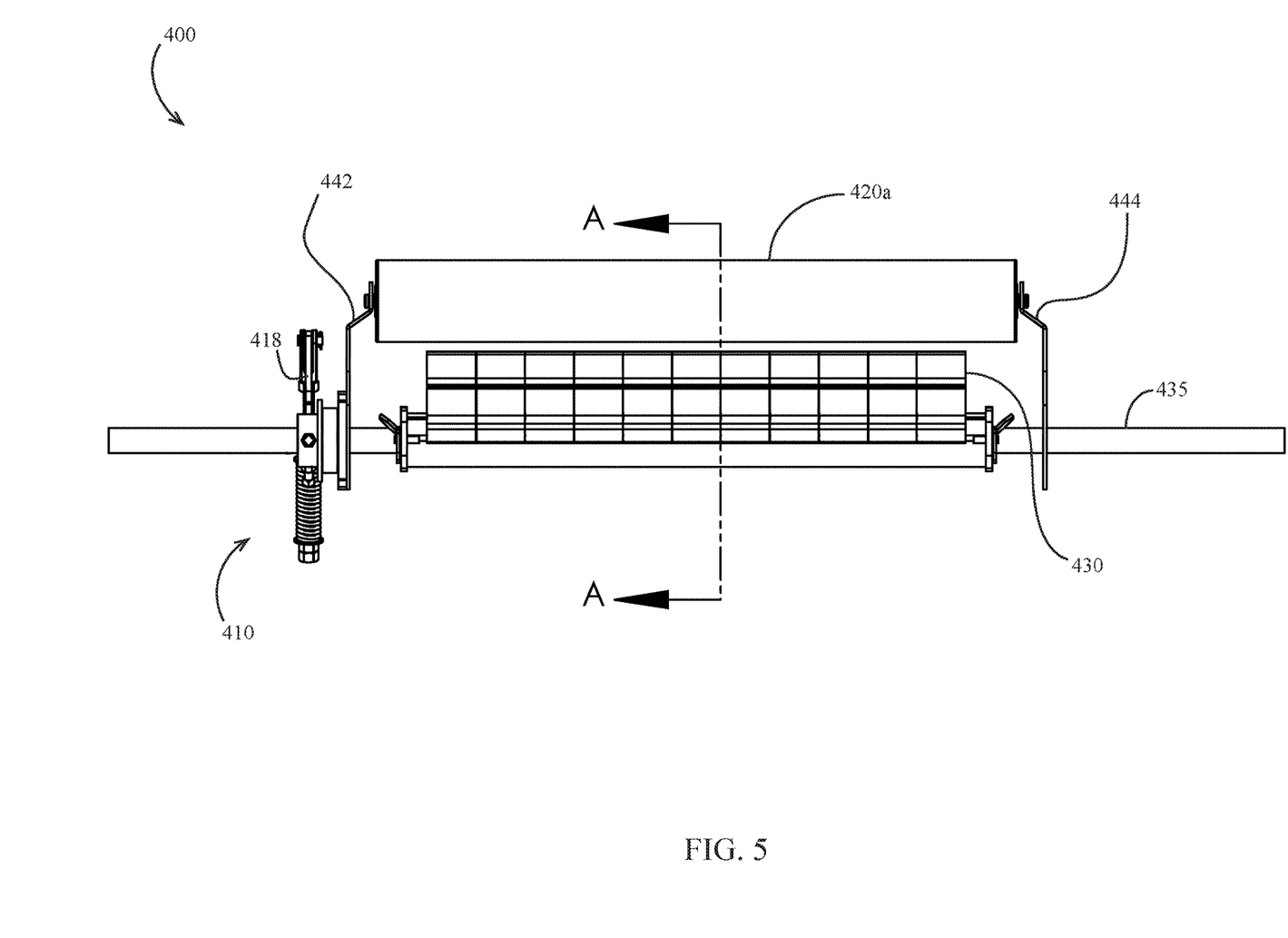
FIG. 5 is front view of another embodiment of a belt cleaner assembly.
Figure 6:
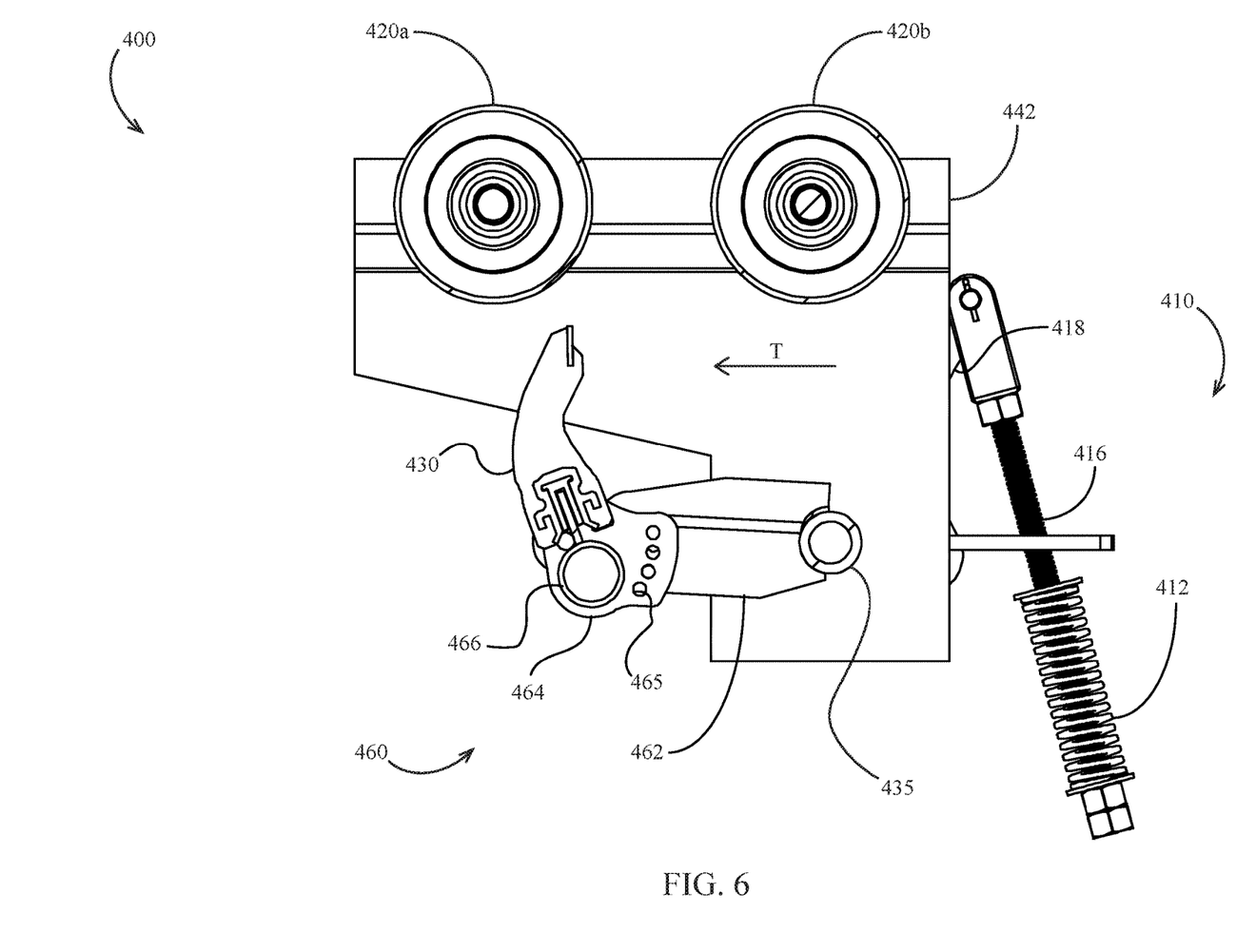
FIG. 6 is a sectional view along section A-A of FIG. 5.

It should be appreciated that in various embodiments, different biasing assemblies may be used to bias one or more blades against the conveyor belt. Referring to FIGS. 5 and 6, a conveyor belt cleaner assembly 400 is illustrated in which a biasing torque is applied (e.g., by a biasing assembly 410) to a shaft 435 in order to bias a scraper blade 430 against a conveyor belt.

The assembly 400 optionally comprises rollers 420a, 420b supported on opposing lateral ends by side brackets 442, 444. The shaft 435 is optionally pivotally supported on side brackets 442, 444. The biasing assembly 410 optionally applies a biasing torque to shaft 435 via a lever arm 418. In some embodiments, a biasing assembly 410 is provided on both sides of shaft 435. The lever arm 418 is optionally pivotally coupled to a rod 416. A spring 412 (e.g., compression spring) is optionally disposed on the rod 416 and urges the rod generally downward and to the right on the view of FIG. 6 such that the lever arm 418 and thus shaft 435 are urged in a clockwise direction on the view of FIG. 6. The blade 430 is optionally supported on a link 462. The link 462 optionally extends generally radially from the shaft 435 such that the blade 430 is radially offset from the shaft 435. In some embodiments, an angle of the blade 430 relative to the conveyor belt is adjustable by rotating a blade support 464 on a shaft 466 supported on the link 462; the blade support 464 is optionally selectively lockable in any of a plurality of angular positions relative to link 462 (e.g., by rigidly connecting the link to the blade support using one of a plurality of openings 465 in the blade support).

It should be appreciated that the blades 130 and 430 could be of any configuration and could be replaced with any cleaner device configured to remove material from the belt 14. In various embodiments, the blade 130 comprises a primary scraper, a secondary scraper, or a tertiary scraper. In some embodiments, the blade is made of one or more of urethane, plastic, rubber, metal or another material or combination of materials. In some embodiments, the blade 130 has common features or functionality with one or more embodiments disclosed in U.S. Pat. Nos. 5,975,281 and/or 6,874,616, both of which are incorporated herein by reference.

Figure 9:
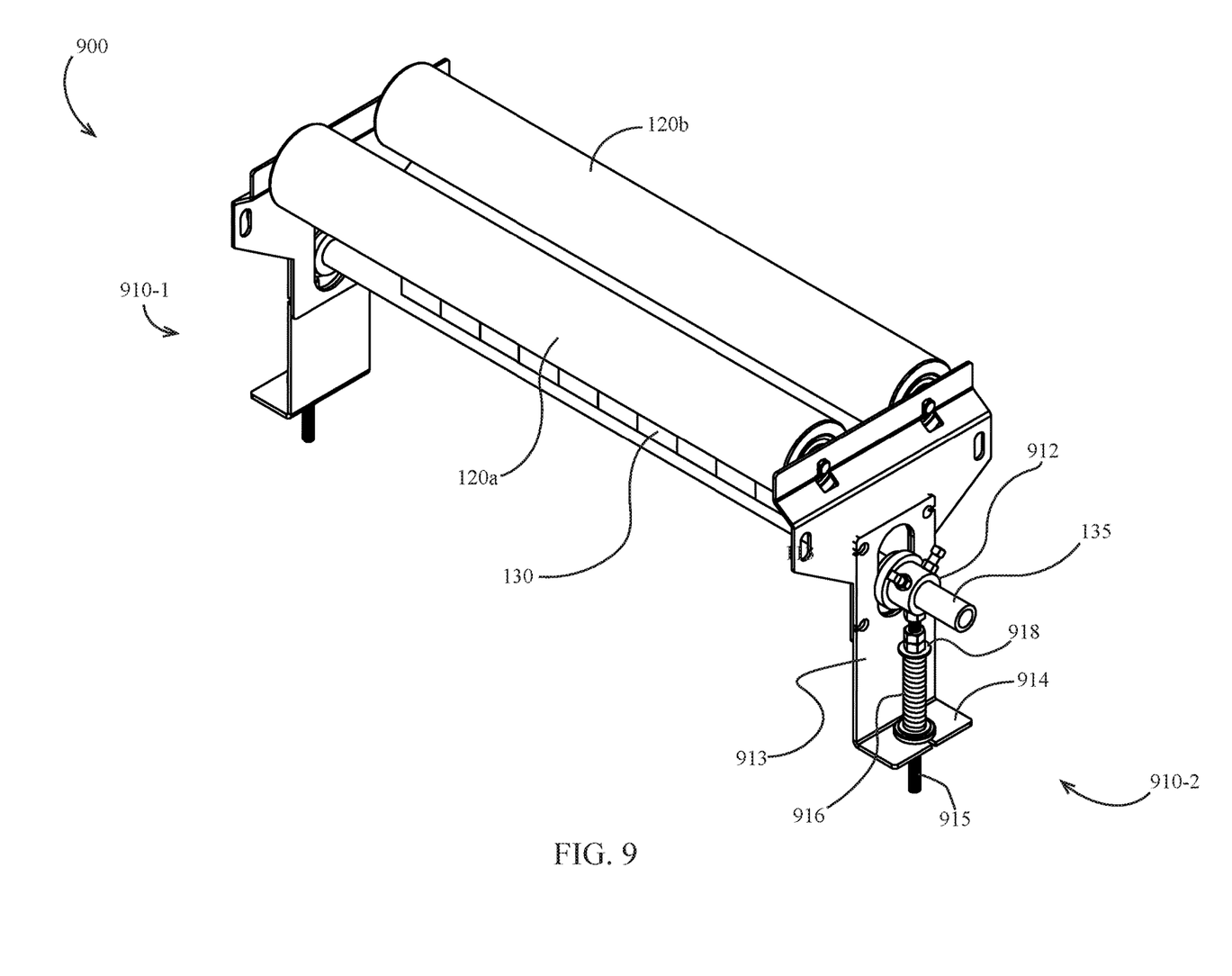
FIG. 9 is a perspective view of another embodiment of a belt cleaner assembly.

Referring to FIG. 9, an alternative cleaner assembly 900 is illustrated comprising biasing assemblies 910 which are generally disposed to press the blade 130 upward into the belt 14. A lip 914 of each assembly 910 is optionally disposed below the shaft 135 (e.g., supported on a downwardly extending bracket 913 supported on the side bracket). A spring 916 (e.g., coil spring, compression spring, etc.) is optionally supported (e.g., directly or indirectly) on lip 914. The spring 916 optionally pushes upward on a washer 918 or other structure disposed to transmit a force to a threaded rod 915. The threaded rod 915 is optionally mounted to a collar 912 which is mounted (e.g., removably mounted such as by set screws or other fasteners) to the shaft 135. Thus the compressive force of the spring 916 of each biasing assembly 910 optionally generally pushes shaft 135 and blade 130 upward into belt 14.

Figure 10:
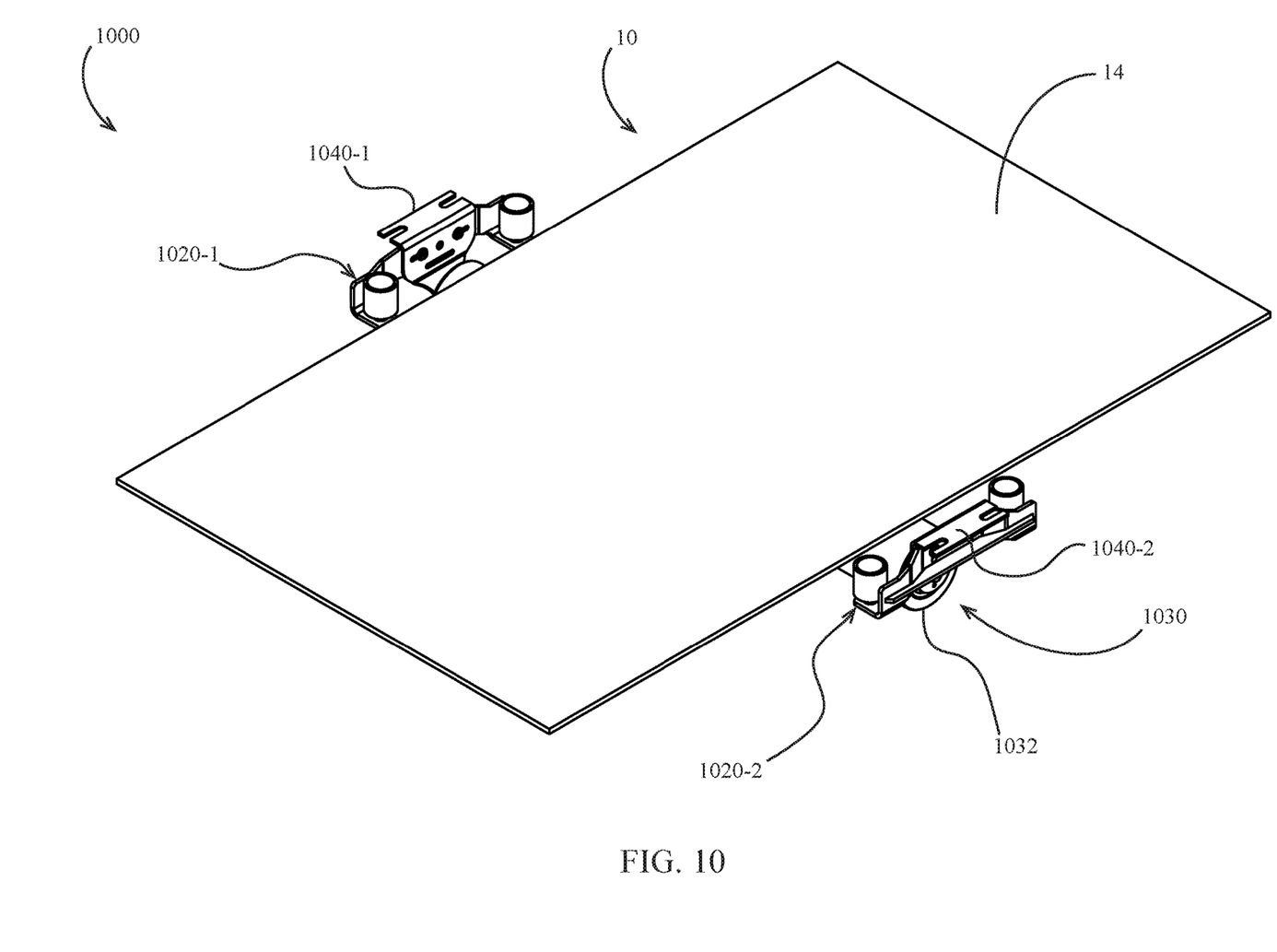
FIG. 10 is a perspective view of an embodiment of a conveyor belt roller assembly installed on an embodiment of a conveyor.
Figure 11:
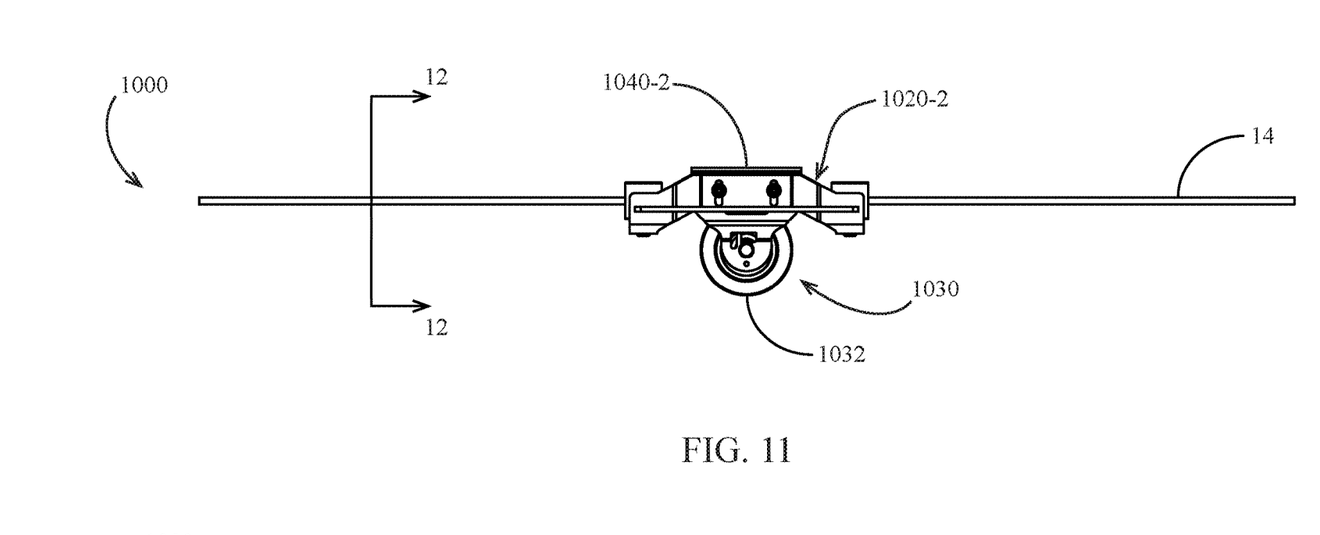
FIG. 11 is a side elevation view of the conveyor belt roller assembly of FIG. 10.
Figure 12:
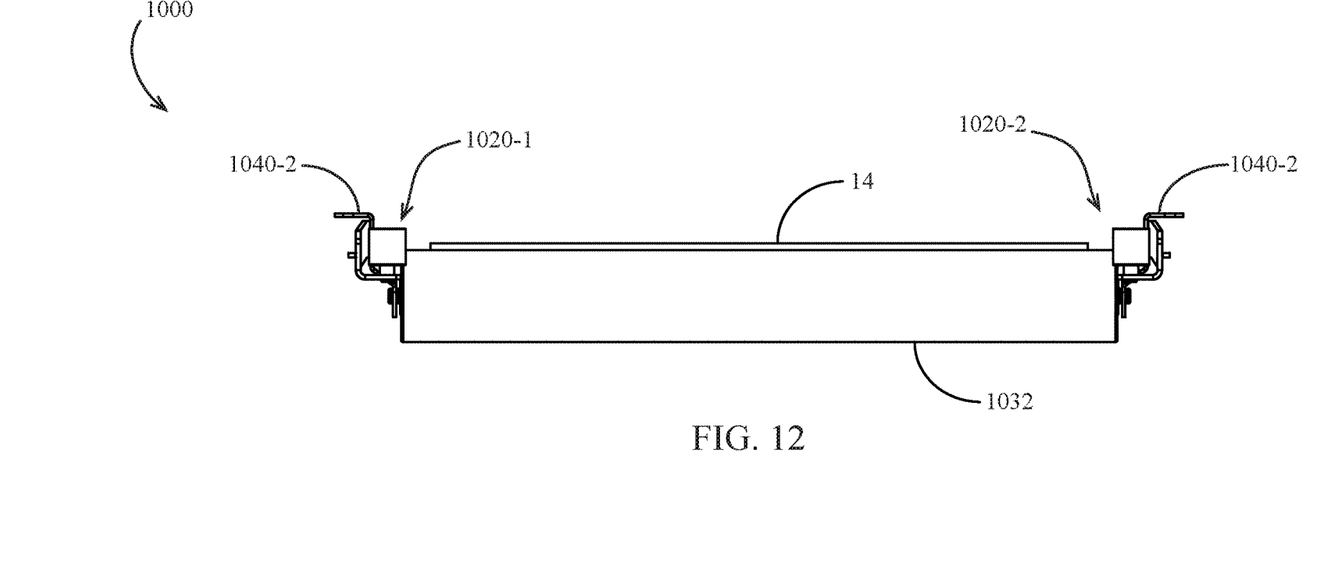
FIG. 12 is a cross-sectional view along section 12-12 of FIG. 11.

FIGS. 10-12 illustrate a conveyor belt roller assembly 1000 which may be mounted (e.g., removably mounted) to the conveyor 10 or to another conveyor embodiment.

The assembly 1000 optionally includes a roller assembly 1030 supported on drop brackets 1040-1, 1040-2. The drop brackets 1040-1, 1040-2 are optionally supported (e.g., mounted such as by bolts or other fasteners) on the rails 12-1, 12-2, respectively, or on other structure of the conveyor. The assembly 1000 optionally includes one or more side roller assemblies 1020 (e.g., assemblies 1020-1, 1020-2), each of which is optionally supported (e.g., mounted such as by bolts or other fasteners) to an associated drop bracket 1040.

The roller assembly 1030 optionally includes a laterally extending roller 1032 which engages a side of the belt 14 (e.g., along a width thereof). The roller 1032 is optionally rollingly supported on drop brackets 1040-1, 1040-2, such as by engaging an axis of roller 1032 with an opening 1045 in support tab 1046 of each bracket 1040 (see FIG. 13).

Continuing to refer to FIGS. 10-12, each side roller assembly 1020 optionally limits lateral movement of the belt 14. Each side roller assembly 1020 optionally includes one or more rollers 1026 which are disposed adjacent to a side of the belt 14. The rollers 1026 optionally rotate along a generally vertical axis such that contact of the roller 1026 with belt 14 does not tend to damage the belt 14. The rollers 1026 are optionally covered with a material (e.g., rubber, etc.) which does not tend to damage the belt 14 upon contact. In some embodiments, the rollers 1026 are replaced with other structure (e.g., a generally vertically oriented pad, arm, non-rolling cylinder, etc.) that limits the lateral movement of belt 14.

Figure 13:
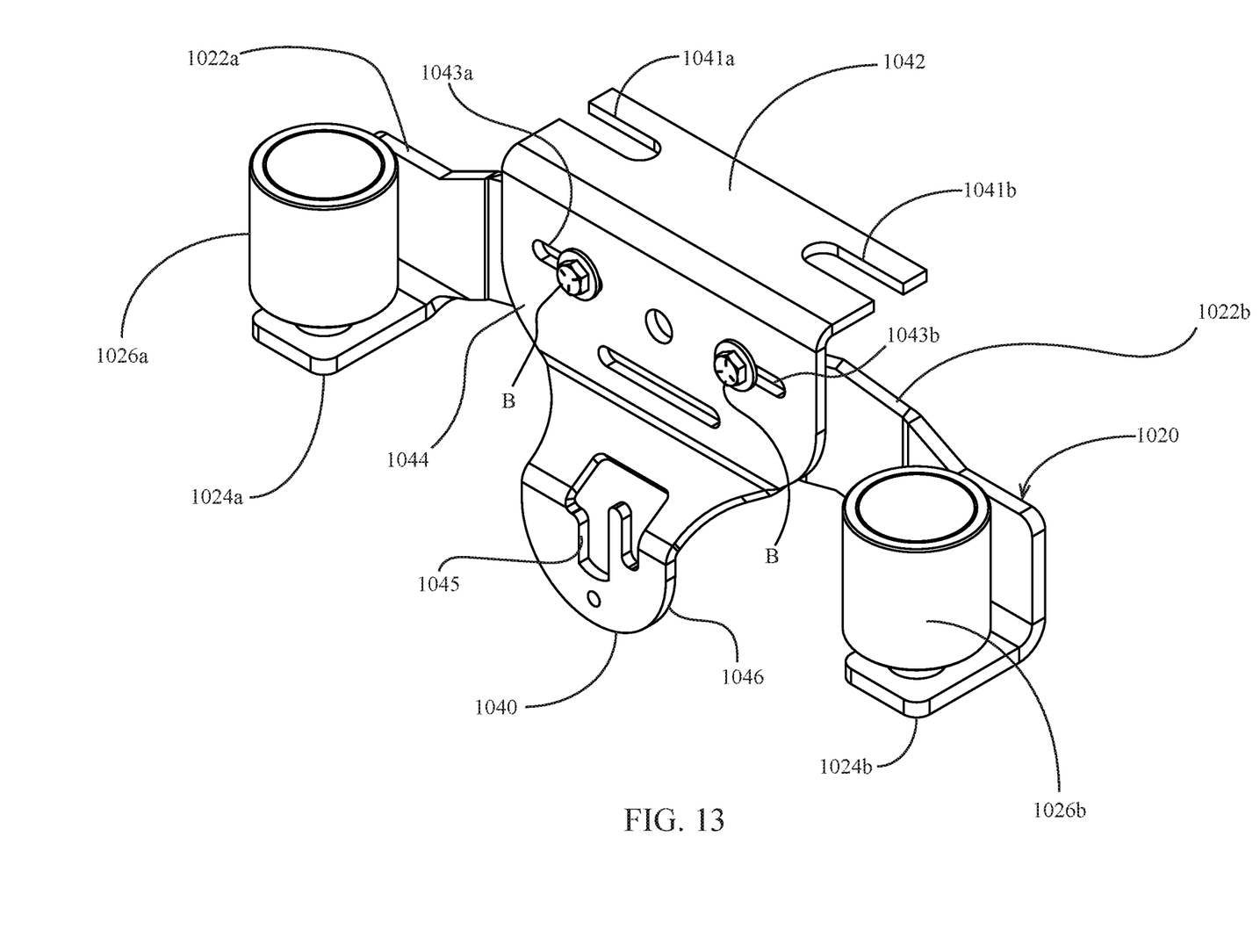
FIG. 13 is a perspective view of an embodiment of a side roller assembly mounted to a drop bracket.

Referring to FIG. 13, the bracket 1040 optionally includes a first surface 1042 (e.g., generally horizontal surface) one or more slots 1041 (e.g., elongate slots, full or partial slots, etc.) for mounting the bracket to a side rail 12 of the conveyor. The bracket 1040 optionally includes a second surface 1044 (e.g., generally vertical surface) connected to (e.g., formed as a part with) the first surface 1042. The second surface 1044 optionally includes one or more slots 1043 (e.g., elongate slots, full or partial slots, etc.) by which the bracket may be mounted to the side roller assembly 1020 and/or the side rails 12 such as by bolts B or other fasteners.

The side roller assembly 1020 optionally includes one or more support arms 1022, each optionally extending generally away from the bracket 1040, e.g., in a direction parallel to the direction of travel of the belt 14. Each support arm optionally supports (e.g., rollingly supports) a roller 1026 such as for rolling about a generally vertical axis. In some embodiments, the support arm 1022 includes a laterally extending lip 1024 on which the roller 1026 is supported. The roller 1026 optionally includes an axle (e.g., generally vertically disposed) and a bearing and/or bushing for rollingly supporting an outer surface on the axle. Support tab 1046 is optionally connected to (e.g., formed as a part with, mounted to, etc.) the second surface 1044.

Figure 14:
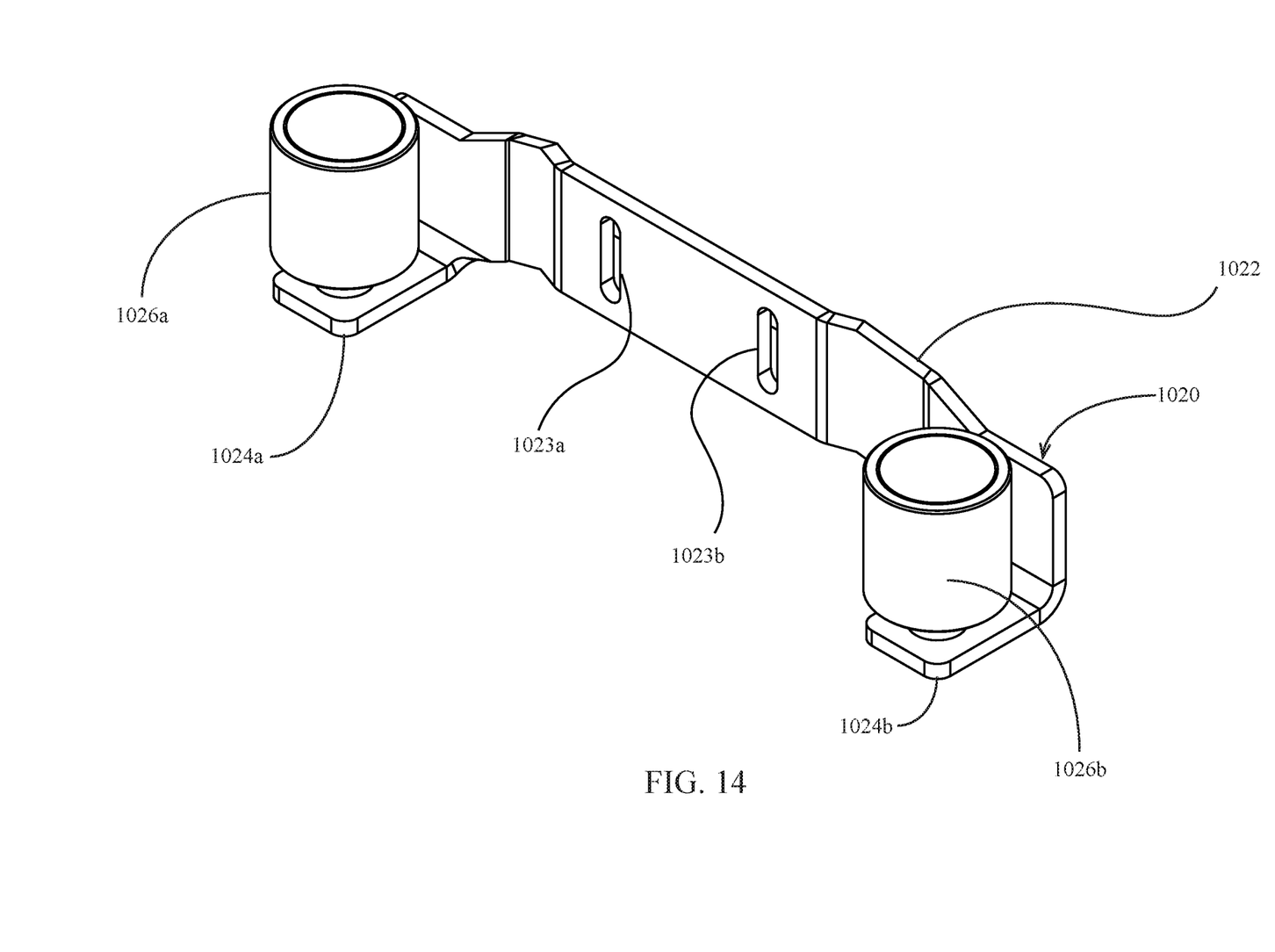
FIG. 14 is a perspective view of an embodiment of the side roller assembly of FIG. 13.

Referring to FIG. 14, each bolt B that extends through a slot 1043 of the drop bracket optionally also extends through a slot 1023 of the side roller assembly (e.g., a slot formed in a support arm 1022) in order to secure the support arm 1022 to the bracket 1040. In some embodiments, the position of the side roller assembly 1020 relative to the drop bracket 1040 is optionally vertically adjustable by vertically adjusting the position of the side roller assembly 1020 before tightening each bolt B at a selected location within the slot 1023. In some embodiments, the position of side roller assembly 1020 is optionally adjustable along the direction of the belt travel by adjusting the position of the drop bracket 1040 before tightening each bolt B at a selected location with in the slot 1043. Thus in some embodiments, the position of side rollers 1026 is optionally vertically adjustable and/or adjustable along the direction of belt travel.

Figure 15:
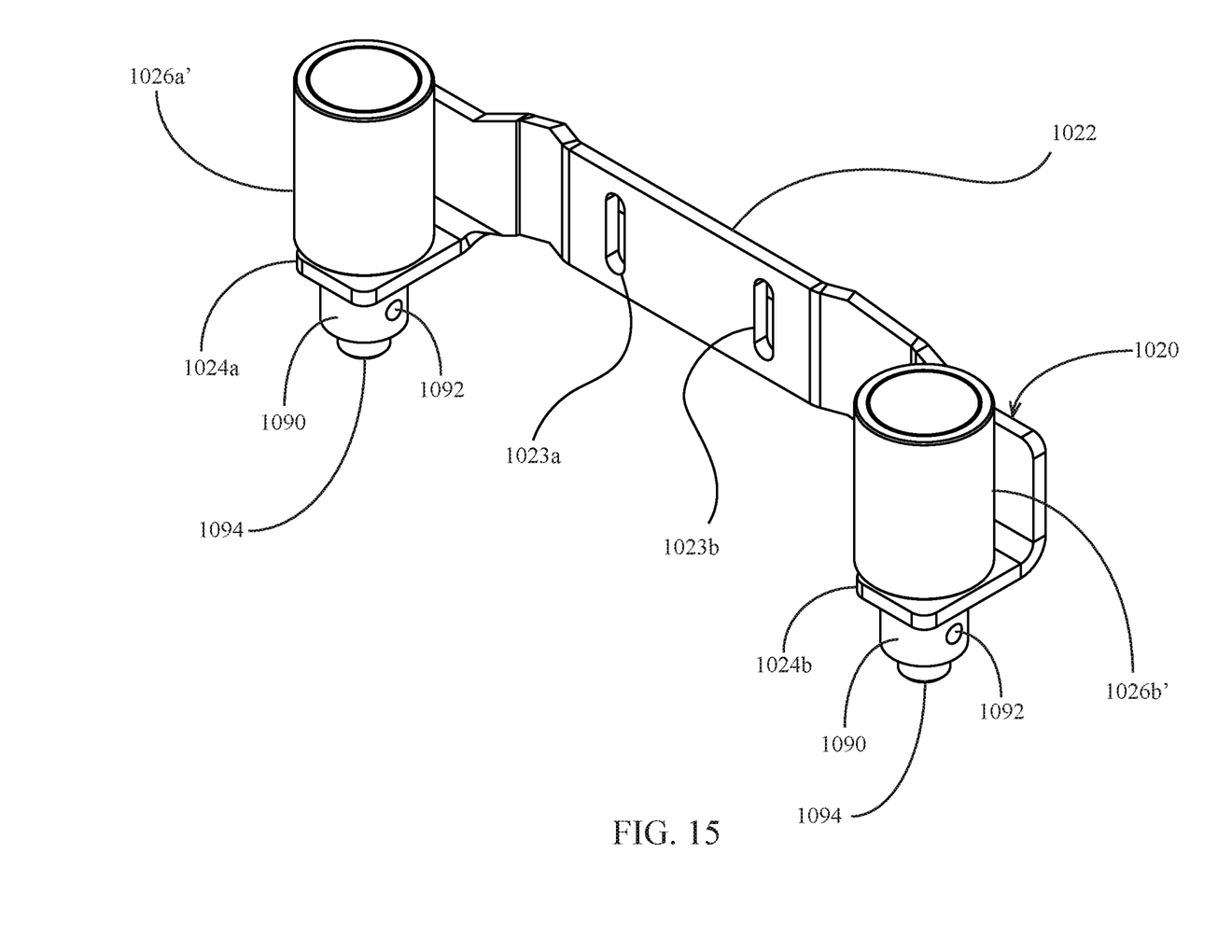
FIG. 15 is a perspective view of another embodiment of a side roller assembly.

Referring to FIG. 15, in some embodiments modified rollers 1026' is optionally removable from and/or replaceable on a support (e.g., the lips 1024). In some such embodiments, the roller 1026' is optionally rollingly mounted to a shaft 1094. The shaft 1094 is optionally removably mounted to a collar 1090 which in turn is optionally mounted to the lip 1024. In some embodiments, a set screw 1092 or other fastener is used to removably (and optionally rigidly) attach the shaft 1094 to the collar 1090.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A conveyor belt cleaner assembly for cleaning a conveyor belt on a conveyor having first and second side rails, comprising:
   a first bracket;
   a second bracket laterally spaced apart from said first bracket;
   a first roller supported on said first and second brackets;
   a second roller longitudinally spaced apart from said first roller, said second roller being supported on said first and second brackets; and
   a belt scraper supported on at least one of said first and second brackets, said belt scraper disposed to contact said conveyor belt, said belt scraper being spaced apart from said first and second rollers to receive said conveyor belt therebetween, wherein said first and second brackets are supported on one or more flexible supports.

2. The conveyor belt cleaner assembly of claim 1, wherein the conveyor belt cleaner assembly is installable and removable from the conveyor along a length thereof.

3. The conveyor belt cleaner assembly of claim 1, further comprising:
   first and second flexible supports attached to said first bracket; and
   third and fourth flexible supports attached to said second bracket.

4. The conveyor belt cleaner assembly of claim 3, wherein each of said first and second flexible supports are configured to be removably attached to the first side rail of the conveyor.

5. The conveyor belt cleaner assembly of claim 4, wherein each of said third and fourth flexible supports are configured to be removably attached to the first side rail of the conveyor.

6. The conveyor belt cleaner assembly of claim 4, wherein at least one of said first and second flexible supports comprises a clamp removably mountable to the first side rail of the conveyor.

7. The conveyor belt cleaner assembly of claim 4, wherein at least one of said first and second flexible supports comprises a length-adjustable element.

8. The conveyor belt cleaner assembly of claim 3, wherein at least one of said flexible supports comprises a length-adjustable element.

9. The conveyor belt cleaner assembly of claim 8, wherein at least one of said length-adjustable elements comprises a turnbuckle.

10. A conveyor belt cleaner assembly for cleaning a conveyor belt on a conveyor having first and second side rails, comprising:
    a first bracket;
    a second bracket laterally spaced apart from said first bracket;
    a first roller supported on said first and second brackets;
    a belt scraper supported on at least one of said first and second brackets, said belt scraper disposed to contact said conveyor belt, said belt scraper being spaced apart from said first roller to receive said conveyor belt therebetween;
    first and second flexible supports attached to said first bracket; and
    third and fourth flexible supports attached to said second bracket, wherein each of said first and second flexible supports are configured to be removably attached to the first side rail of the conveyor.

11. The conveyor belt cleaner assembly of claim 10, wherein the conveyor belt cleaner assembly is installable and removable from the conveyor along a length thereof.

12. The conveyor belt cleaner assembly of claim 10, wherein each of said third and fourth flexible supports are configured to be removably attached to the first side rail of the conveyor.

13. The conveyor belt cleaner assembly of claim 10, wherein at least one of said first and second flexible supports comprises a clamp removably mountable to the first side rail of the conveyor.

14. The conveyor belt cleaner assembly of claim 10, wherein at least one of said first and second flexible supports comprises a length-adjustable element.

15. The conveyor belt cleaner assembly of claim 10, wherein at least one of said flexible supports comprises a length-adjustable element.

16. The conveyor belt cleaner assembly of claim 15, wherein at least one of said length-adjustable elements comprises a turnbuckle.

17. The conveyor belt cleaner of claim 10, further comprising:
- a second roller longitudinally spaced apart from said first roller, said first roller being supported on said first and second brackets.

18. The conveyor belt cleaner assembly of claim 17, wherein at least one of said first and second flexible supports comprises a length-adjustable element.

* * * * *